United States Patent [19]
Connell

[11] 3,886,733
[45] June 3, 1975

[54] PNEUMATIC ENERGY SOURCE UTILIZING LIQUID OXYGEN

[75] Inventor: Joseph A. Connell, Fountain Valley, Calif.

[73] Assignee: NRG Incorporated, Phoenix, Ariz.

[22] Filed: Aug. 24, 1973

[21] Appl. No.: 391,233

[52] U.S. Cl. .................. 60/39.48; 23/281; 62/52; 62/55
[51] Int. Cl. ............ F02g 3/00; F17c 7/02
[58] Field of Search ............ 60/39.46, 39.48, 39.55, 60/39.58, 39.69, 257–260, 208–210; 62/45, 55; 23/281; 9/321; 417/394, 395

[56] References Cited
UNITED STATES PATENTS

| | | | |
|---|---|---|---|
| 1,828,784 | 10/1931 | Perrin | 60/39.59 |
| 2,770,097 | 11/1956 | Walker | 60/39.55 |
| 2,852,916 | 9/1958 | Hearn et al. | 60/259 X |
| 3,030,780 | 4/1962 | Loveday | 62/54 |
| 3,195,620 | 7/1965 | Steinhardt | 62/45 |
| 3,280,555 | 10/1966 | Charpentier et al. | 60/34.53 X |
| 3,431,742 | 3/1969 | Green | 60/39.48 X |
| 3,440,829 | 4/1969 | Davies-White | 62/55 |
| 3,561,210 | 2/1971 | Wiseman | 60/320 X |
| 3,640,083 | 2/1972 | Galbraith et al. | 60/39.48 X |
| R25,065 | 10/1961 | Daley et al. | 62/45 X |

*Primary Examiner*—Clarence R. Gordon
*Assistant Examiner*—Robert E. Garrett
*Attorney, Agent, or Firm*—Knobbe, Martens, Olson, Hubbard & Bear

[57] ABSTRACT

A source of pneumatic power is disclosed in which liquid oxygen and a liquified inert gas are stored within a dewar separated by a flexible membrane. The liquid oxygen is mixed in a combustion chamber with a hydrocarbon fuel, such as aviation fuel, and ignited. The liquified inert gas is supplied to the combustion chamber where it is vaporized and expands. Thus, a high pressure gas is produced for operating pneumatic devices.

20 Claims, 7 Drawing Figures

PNEUMATIC ENERGY SOURCE UTILIZING LIQUID OXYGEN

BACKGROUND OF THE INVENTION

This invention relates to the field of generating pneumatic power and more particularly for generating pneumatic power for starting gas turbine engines such as those found on jet aircraft and for powering pneumatic devices aboard aircraft for the production of emergency control power in the aircraft.

DESCRIPTION OF THE PRIOR ART

Pneumatic energy is required to start most of the gas turbines which power present aircraft. Most such gas turbine aircraft incorporate an air turbine starter mounted on the gas turbine engine. The gas turbine engine is brought up to self-sustaining speed by high pressure, high temperature gas directed to the air turbine starter. A pressure of approximately 35 psig and a flow rate of approximately 100 lbs. per minute is required to start the gas turbine engines on present aircraft. Presently available units for supplying this pneumatic power are either small gas turbines or mechanically driven compressors. Both of these units are high in initial cost, difficult to maintain and expensive to overhaul. More importantly, both types of units have a limited output capacity both as to rate of flow and gas pressure. In addition, some present aircraft include air turbine motors which, on the application of pressurized gas, operate aircraft control systems such as the hydraulic and electrical gear aboard the aircraft at times when the main gas turbine engines and their associated hydraulic and electrical generators are not operating. Small gas turbines and mechanically driven compressors have commonly been used for driving these air turbine motors.

An improved source of pneumatic power is disclosed in U.S. Pat. No. 3,591,962, issued to Joseph A. Connell, on July 13, 1971, and assigned to the assignee of the present invention. This prior art pneumatic source utilized a heat storage matrix comprising solid material which was preheated to an elevated temperature. Liquified gas or cryogenic liquid was injected into direct contact with this heat retaining matrix to vaporize the liquified gas and thereby produce a high pressure gas source. The heat retaining matrix disclosed in that patent is necessarily relatively heavy and is therefore useful primarily as ground support equipment and as a means for producing start capability aboard relatively large aircraft.

It should be realized that emergency starting power is often of critical importance aboard aircraft since aircraft having no on-board starting capability are incapable of starting under their own power at a remote ground location and are capable of starting their engines in flight during an emergency situation only by rotating the engines through a rapid descent of the aircraft. This rapid descent is often dangerous both due to the hazard that the additional stress places on the aircraft itself and due to the fact that, in the case of military aircraft, the placement of the aircraft at a low altitude may itself present a hazard.

The use of on-board small turbine engines for burning of fuel and thereby starting the larger gas turbine engines suffer from drawbacks in addition to the difficulty of maintenance and high initial cost mentioned above. These systems necessarily utilize ambient air for the combustion process and are often incapable of satisfactory operation at extremely high altitudes. It may be necessary, therefore, to initially reduce the altitude of the aircraft before such systems can be used, which altitude reduction creates hazards, particularly in combat situations.

In addition, prior art starting systems have been developed which utilize compressed air tanks to supply the air necessary for combustion of a fuel in a combustion chamber, in order to avoid the problems associated with high altitude starting. Such systems, however, suffer from the commonly known dangers associated with the transportation of ultra high pressure gas storage tanks, and additionally are severely limited in the amount of usable pneumatic power which may be produced.

SUMMARY OF THE INVENTION

The present invention produces pneumatic power on board an aircraft which may be used for generation of hydraulic and electrical power in an emergency situation and which may be likewise used for starting the aircraft jet engine in such a situation, either on the ground at a remote location or during flight. In addition, the present invention makes possible an extremely small, lightweight ground support equipment package which may easily be transported to or from an aircraft to supply emergency power or emergency starting of the aircraft engines. In order to produce the large quantities of gas which are required for such a system without requiring extremely large and heavy equipment which would be inappropriate for an on-board system or a lightweight portable ground support system, the present invention utilizes a pair of cryogenic liquids, one of which is oxygen, for combination with a standard hydrocarbon fuel, such as aviation fuel, which is normally carried on board the aircraft. The liquid oxygen is first mixed with the hydrocarbon fuel and ignited to produce an extremely high temperature flame within a combustion chamber. The second cryogenic liquid, which is typically an inert material, is then injected in the vicinity of this high temperature flame so that this second cryogenic liquid may be vaporized and expanded to cool the high temperature exhaust gas from the combustion chamber while substantially increasing the mass flow of the effluent gas. A particularly advantageous feature of the present invention exists in the ability to store liquid oxygen without any boil-off or evaporation of this material during storage; thus, avoiding the possible hazards associated with boil-off of oxygen to the atmosphere. In addition, the use of liquid oxygen in the combustion process enables the emergency pneumatic system to operate regardless of the ambient temperature or altitude of the aircraft. The storage of liquid oxygen without the normal boil-off associated with such storage is accomplished through the use of a single dewar or insulated cryogenic vessel which stores the inert cryogenic liquid or liquified gas. Within this dewar is a second vessel which is used to store the liquid oxygen. The inert material is selected such that, at a given pressure, its boiling point temperature is lower than the boiling point temperature of the liquified oxygen, so that the liquified oxygen is always being maintained in surroundings which are below its boiling point at the storage pressure. Thus, the liquid oxygen is maintained well below its boiling point and surrounded by an inert liquified gas to provide an extremely safe and stable storage environment.

These and other advantages of the present invention are best understood through a reference to the drawings, in which.

DETAILED DESCRIPTION OF THE PREFERRED EMBODIMENT

Figure 1:
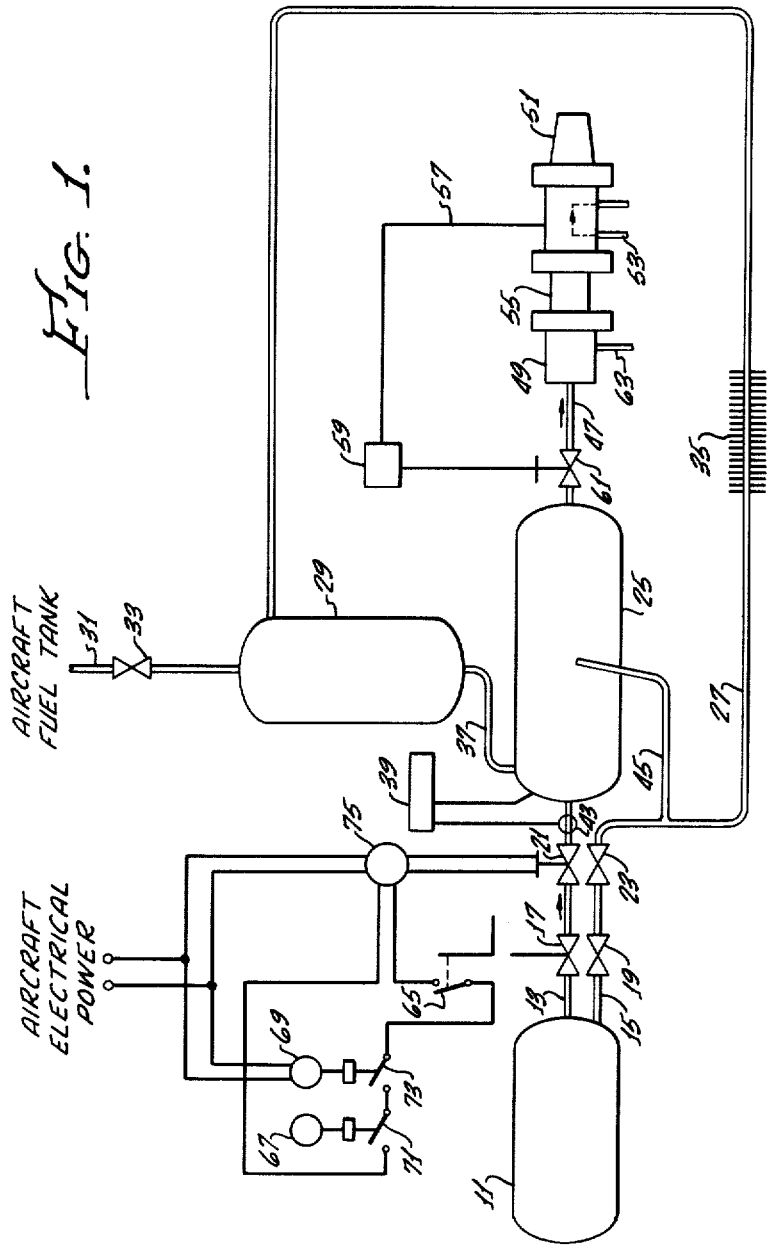
FIG. 1 is a schematic illustration of the emergency aircraft control system of the present invention.

Referring initially to FIG. 1, the emergency aircraft control system of the present invention will be described. A liquid storage tank 11 is utilized to maintain a quantity of inert cryogenic liquid or liquified gas, such as liquid $N_2$, He, etc. during flight prior to use of this emergency system. In addition, the cryogenic storage vessel 11 contains a quantity of liquified oxygen which is maintained within the quantity of liquified inert gas so as to be both insulated and pressurized by the inert liquified gas as will be explained in detail below. The insulation of the liquified oxygen by the liquified inert gas prevents boil off of the liquid oxygen. In order to prevent boil off of the liquified inert gas to the greatest extent possible due to heat leakage of the vessel 11, the vessel is constructed as a standard dewar having an inner and outer shell, a vacuum being drawn between the inner and outer shell, and a layer of compressed superinsulation wrapped about the inner shell. In order to draw the liquified inert gas as well as the liquified oxygen from this vessel 11 without the need for complex or fault-susceptible equipment, the liquified inert gas, typically liquid nitrogen, is maintained within the vessel 11 at an elevated pressure, in an exemplary embodiment 492 psia, while the temperature remains in the cryogenic region, in the exemplary embodiment −232°F. It has been found particularly advantageous to maintain the liquid in its critical state, which the temperature and pressure of the exemplary embodiment represent, since in its critical state the densities of both the liquid and the gas phases are identical and the tank contents therefore exist in a homogeneous gas/liquid state similar to a fog which may be withdrawn regardless of the orientation of the vessel 11 as the attitude of the aircraft changes, without loss of pressure or mass flow. Alternatively, the liquified inert gas may be stored in its saturated state, which requires that the airborne system include a storage vessel 11 which permits withdrawal of the liquified inert gas regardless of the orientation of the aircraft. Both critical and saturated storage enhance the capability of the liquified inert gas to provide pressure for withdrawal of the contents of the vessel 11, as will be explained below. In addition, the liquified oxygen is maintained within a flexible bladder within the liquified inert gas in the vessel 11 so that the critical or saturated state of the liquified inert gas will maintain a pressure on the flexible membrane and will assure proper withdrawal of the liquid oxygen regardless of the orientation of the vessel 11. Since, as will be readily understood to those skilled in the art, the liquified inert gas within the vessel 11 will maintain itself in a pressurized state during storage due to heat leakage through the walls of the vessel 11 and the resultant boiling of the cryogenic liquid, the flexible bladder assures that the pressure of the liquified oxygen will likewise be maintained due to the flexible interface between the two liquified gases.

However, when the liquified inert gas is rapidly drawn from the vessel 11, the pressure within the vessel 11 will be decreased under normal circumstances and heat entering the vessel 11 through the walls would not ordinarily be sufficient to boil enough liquid to maintain the pressures within the vessel 11 for any length of time. However, the maintenance of the liquified inert gas in a critical or saturated state during storage significantly enhances the ability of the liquified inert gas to maintain both its own pressure and the pressure of the liquified oxygen within the vessel 11 during removal of each of these liquified gases, thus permitting use of virtually the entire contents of the vessel 11 without complex pumping equipment.

The vessel 11 is connected by means of a liquified oxygen fluid conduit 13 and a liquified inert gas conduit 15 to a pair of separate manually controlled fluid valves 17 and 19 respectively which may be actuated by an operator or the pilot to permit the flow of each of these cryogenic liquids or liquified gases through a pair of normally open solenoid valves 21 and 23, respectively, to the input of a combustion chamber 25.

In addition, a portion of the liquified inert gas is advantageously conducted by means of a fluid conduit 27 to a fuel holding tank 29 for pressurizing this tank 29. When the system is in the standby mode, before system operation, fuel is pumped from the aircraft fuel tank through a conduit 31 and a check valve 33 into the fuel holding tank 29. When the system is activated, a small portion of the liquified inert gas in the fluid conduit 27 is vaporized in a common finned-tube heat exchanger 35 to produce a pressurized gas for pressurizing the fuel within the fuel tank 29. The check valve 33 operates to prevent loss of this pressure within the fuel tank 29 into the aircraft fuel tank and to thus assure a quantity of fuel in the fuel tank 29 under pressure. Thus, on activation of the system, fuel is supplied under pressure through a conduit 37 to the combustion chamber 25.

Within the combustion chamber 25, the liquified oxygen from the valve 21 is mixed with the aircraft fuel from the conduit 37 and the tank 29 and is ignited by an ignition system 39 through an ignition cable 41 connected to the combustion chamber 25. The ignition system 39 may advantageously be responsive to a flow sensor 43 which senses flow of liquid oxygen within the conduit leading from the valve 21 to the combustion chamber 25 so that the ignition system 39 produces ignition pulses on the cable 41 whenever flow of liquid oxygen occurs, that is, whenever the system is in operation.

Within the combustion chamber 25, the mixture of liquid oxygen and aircraft fuel burns with intense heat after being ignited by the ignition system 39. Into this intense flame is injected the liquified inert gas supplied from the valve 23 by a conduit 45. The liquified inert gas is vaporized by the heat within the combustion chamber 25 and serves to cool the effluent combustion gasses. Thus, the exhaust gas from the combustion chamber 25 is substantially cooled and its mass flow rate is substantially increased by the introduction of the liquified inert gas from the conduit 45. It should be readily recognized that the rate of flow of liquified inert gas as well as the rate of flow of liquified oxygen and aircraft fuel to the combustion chamber 25 may advantageously be regulated through the use of orifices or through flow regulating valves which are familiar to the flow control art. The exhaust gas from the combustion chamber 25 is conducted by means of a fluid conduit 47 to a turbine 49 which substantially reduces the pressure of the exhaust gas to produce mechanical energy. The turbine 49 is advantageously a single stage axial flow partial admission turbine having an optimum operating speed at 96,000 RPM. The turbine 49 is mounted to axially drive a variable displacement hydraulic pump 51 and an electrical generator 53 through a reduction gearbox 55. The output frequency of the electrical generator 53 is monitored through an electrical connection 57 and serves as the input to a frequency sensitive controller 59 which operates a regulating valve 61 in the conduit 47 in a standard manner to maintain the optimum operative speed of the turbine 49. The exhaust gas from the turbine 49 is conducted by means of a fluid conduit 63 to ambient.

The control system used to operate the preferred embodiment aircraft control system in an emergency situation may now be described. As previously described, the operation of this emergency aircraft control system may be initiated by the opening of the manual control valves 17 and 19 which are advantageously ganged together, initiating a flow of both liquified inert gas and liquified oxygen from the vessel 11 and thereby initiating flow through the heat exchanger 35 to build up pressure within the fuel tank 29 to initiate a flow of fuel from the tank 29 into the combustion chamber 25. In addition, operation of these manual control valves 17 and 19 will operate the flow sensor 43 to initiate operation of the ignition control system 39. However, an automatic emergency system is shown in FIG. 1 which includes a switch 65 which is operated by the manual control valves 17 and 19 such that when these manual control valves are open, the switch 65 is closed. When the normal electrical and hydraulic power systems of the aircraft are in operation, the output hydraulic pressure and electric current operate a hydraulic switch actuator 67 and a solenoid switch actuator 69 to close a pair of switches 71 and 73 respectively. These switches are in series and are in turn connected in series with the switch 65 and serve to operate a relay 75. The relay 75 operates to close the normally open solenoid operated valves 21 and 23. Therefore, if the operator or pilot opens the manual control valve 17 and 19 after the aircraft engines have been started, the switch 65 will close and each of the switches 71 and 73 will be in a closed condition due to normal operation of the hydraulic and electrical systems of the aircraft. These switches therefore complete the circuit to the relay 75, operating to close the solenoid control valves 21 and 23 prohibiting system operation. It will thus be recognized that, upon failure of either the hydraulic or the electrical system operation in the aircraft, one of the switches 71 or 73 will be changed to an open condition and the relay 75 will operate the solenoid valves 21 and 23 to automatically initiate system operation.

If, at the end of a flight, the system has not been used, the pilot or operator has merely to close the manual control valves 17 and 19 before shutting down the aircraft engines so that the relay 75 will actuate the solenoid valves 21 and 23 to their normally open configuration, permitting the engines to be shut down without initiation of this emergency system.

Figure 2:
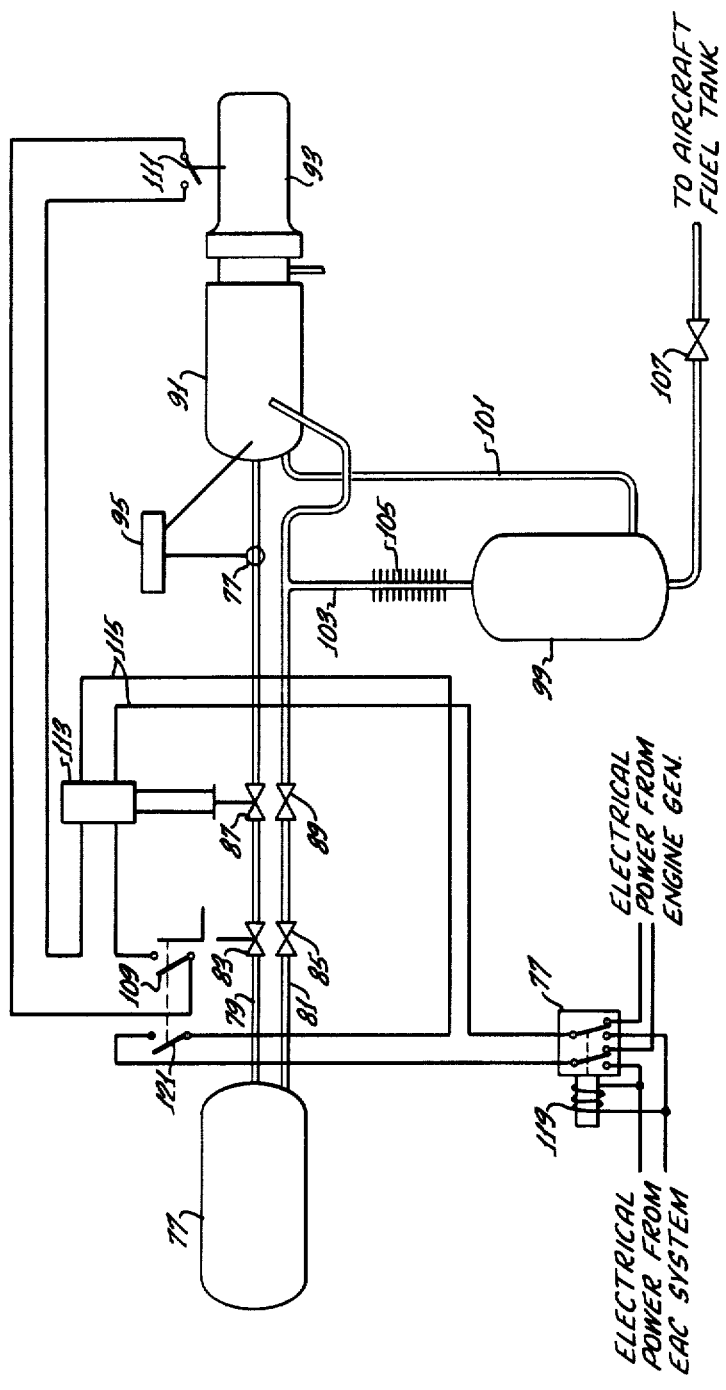
FIG. 2 is a schematic illustration of the emergency engine starting system of the present invention.

Referring now to FIG. 2, a similar system to that of FIG. 1 adapted to the emergency starting of aircraft engines and particularly the starting of jet engines will be described. A cryogenic liquid or liquified gas storage tank 77 similar to the storage tank 11 of FIG. 1 maintains a supply of both liquified oxygen and a liquified inert gas. The liquified substances may pass by means of fluid conduits 79 and 81 through a pair of manually operated control valves 83 and 85 which advantageously operate in tandem. The material then passes through a pair of normally open solenoid operated valves 87 and 89 to a combustion chamber 91 which is identical in construction to the combustion chamber 25, except that it is advantageously attached directly to the air turbine starter 93 of the jet engine. As with the system shown in FIG. 1, an ignition control circuit 95 supplies ignition current to the combustion chamber 91 in response to actuation of a flow sensor 97 in the liquid oxygen conduit. Also similar to the system of FIG. 1, a fuel tank 99 supplies hydrocarbon fuel through a conduit 101 to the combustion chamber 91 and is preferably pressurized to cause this flow by a connecting conduit 103 leading from the liquified inert gas line and a heat exchanger 105 which produces pressurized gas from the liquified inert gas. Also similar to the system shown in FIG. 1 is a check valve 107 through which fuel may be supplied from the aircraft fuel tank to the fuel holding tank 99, the check valve 107 prohibiting flow of fuel from the fuel holding tank 99 under pressure to the aircraft fuel tank.

The controls which are used to automatically initiate the aircraft starting system are somewhat similar to the controls shown in FIG. 1 for the emergency aircraft control system and consist of a switch 109 which is operated by the manual control valves 83 and 85 so that opening of the manual control valves closes the switch 109. When the starter RPM has increased to its normal starter cut-out speed, a starter cut-out switch 111 will close to complete the circuit to a relay 113, closing the solenoid operated valves 87 and 89. By thus automatically deenergizing this starter system, reserve cryogenic liquid within the storage tank 77 is maintained so that repeated starting attempts may be made. In order to insure that electrical power is available to relay 113 through the power lines 115 regardless of whether the aircraft is powered by the emergency aircraft system of FIG. 1 or the normal aircraft electrical system, a relay 117 may be incorporated in the system having terminals which normally conduct electricity from the standard electrical power from the aircraft engine generators but which will conduct power from the emergency aircraft control system of FIG 1 if this system is operating. Operation of the control system of FIG. 1 will energize the relay coil 119 to throw the contacts of the relay 117 into their alternate position. A switch 121 within the output line from the relay 117 is advantageously ganged to operate in parallel with the switch 109 from actuation of the manual control valves 83 and 85. Thus, when the emergency aircraft system power from the system shown in FIG. 1 is terminated, the electrical power to close the solenoid operated valves 87 and 89 will be supplied from the engine driven generators until the manually operated control valves 83 and 85 are closed. Closure of valves 83 and 85 will open switch 109 and allow the solenoid operated valves 87 and 89 to open, thereby placing the starter system in a standby configuration.

Figure 5:
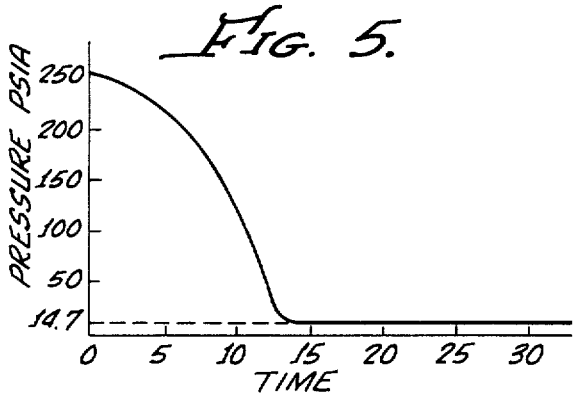
FIGS. 5 through 7 are charts showing the pressure within the liquified gas storage vessel of the present invention, under various conditions, with the passage of time.

FIG. 5 illustrates yet another embodiment of the present invention. Since this embodiment is considerably simpler in construction than are the embodiments shown in FIGS. 1 and 2, the explanation of this embodiment will be used as a means for describing the details of the preferred construction of the cryogenic storage vessels 11, 77 and 123 and the combustion chambers 25, 99 and 125.

Figure 3:
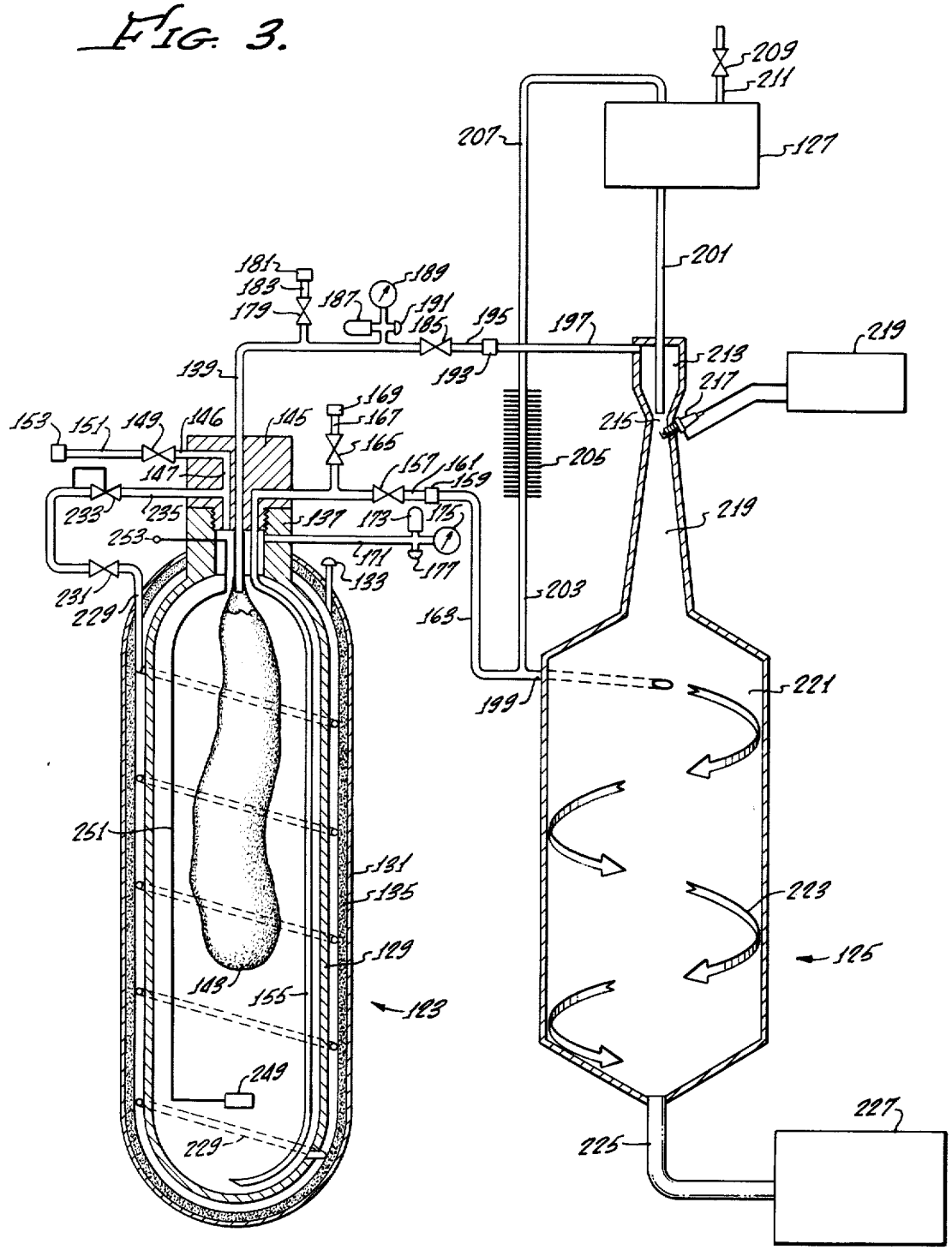
FIG. 3 is a detailed schematic view showing the configuration of the liquified storage vessel and combustion chamber of the present invention, embodied in an easily portable supply embodiment of the present invention.

The embodiment shown in FIG. 3 is designed as an easily transportable emergency pneumatic source which may be used, for example, on runways or remote field locations to produce emergency pneumatic power for the operation of pneumatic systems aboard aircraft or for the starting of jet aircraft engines. It should be understood, therefore, that the cryogenic storage vessel 123, the combustion chamber 125, a hydrocarbon fuel tank 127 and all of the interconnecting valves and couplings are conveniently arranged and mounted on a wheeled cart so that they may be easily transported and operated by one person to generate pneumatic power. It will thus be understood that this is a totally self-contained unit requiring no substantial start up time which is readily transported and activated in an emergency situation or at a remote field location.

The cryogenic liquid or liquified gas storage vessel 123 is preferably a double walled vacuum storage vessel having an inner wall 129 and an outer wall 131 between which there is a void which is preferably evacuated for safety purposes. A vacuum bursting disc 133 is connected to the evacuated void between the walls 129 and 131 and is designed to burst at a pressure differential of 18 psig. Therefore, if the outside of the container 123 is subjected to a pressure greater than approximately 18 psig, the bursting disc 133 will rupture and will thereby avoid possible damage to the vessel 123 due to excessive external pressure. The outer wall 131 of the vessel 123 is preferably internally lined with an insulator 135 such as the super insulator formed by alternate thin layers of aluminum foil and fiberglass. This double insulation formed by the evacuated void and the insulator 135 allows storage of cryogenic liquid or liquified gas at very low temperatures for a sufficiently extended period of time so that its storage is economically feasible.

The storage vessel 123 includes an upper mounting bulkhead 137 which, in addition to sealing the evacuated void between the walls 129 and 131, supports the inner wall 129 relative to the outer wall 131. A plug 145 is attached, as by threading, to the bulkhead 137 and provides support for a plurality of fluid connections to the interior cavity of the vessel 123 exterior of a bladder 143, that is to the liquified inert gas storage area of the vessel 123. This plug 145 also provides access to the central liquid oxygen cavity within the wall 129 through a piped connection 139 and maintains the separation between the liquid oxygen portion of the storage vessel 123 and the liquified inert gas portion through a depending tubular flange 141 on which a flexible bladder 143 is mounted. It will be seen that the piped connection 139 passes through the depending tubular flange 141 to communicate with the interior of the bladder 143.

The flexible bladder 143 is designed to be flexible at the storage temperature of liquid oxygen and the storage temperature of the liquified inert gas to be used, and may advantageously be constructed, for example, of polyester film, such as mylar or kapton or any material which retains sufficient flexibility at cryogenic temperatures to operate as a bladder. Alternatively, the bladder 143 may be in the form of semi-rigid bellows, constructed, for example, of stainless steel, and having sufficient flexibility to transmit pressure between the outside and inside of the bellows. The bladder 143 is advantageously sufficiently flexible so that the pressure which exists outside of the bladder 143 in the liquified inert gas portion of the storage vessel 123 will be transmitted to the liquid oxygen within the bladder 143 to pressurize the liquid oxygen. The bladder 143 is also advantageously sufficiently temperature conductive to allow some thermal conduction so that the liquid oxygen within the bladder 143 may be reduced in temperature substantially below the boiling point at the storage pressure so that boil off of the liquid oxygen is prevented.

Mounted on the plug 145 is a gas outlet tube 146 which is connected to a bore 147 of the plug 145 and is therefore connected to the upper end of the liquified inert gas portion of the storage vessel 123. Since the vessel 123 is normally not completely filled with liquified inert gas and the bore 147 is in communication with the upper portion of the vessel and therefore the vapor phase of the liquified inert gas which is stored in the vessel 123, a gas valve 149 is connected to the tube 146. A tube 151 connected to the outlet of the valve 149 leads to a connector 153 which allows tapping directly from the gas above the liquified inert gas. The gas valve 149 is a manual valve and, during normal operation, it is only opened while the vessel 123 is being filled, as explained below. Opening the valve 149 will relieve the pressure within the vessel 123 and is therefore a form of safety mechanism for the device. However, the heat input to the vessel 123, as will be explained in detail below, is not normally sufficient to maintain the pressure required for the production of pneumatic energy as the gas is drawn from the top of the vessel 123, and gas is therefore not normally tapped from this connection.

A tube 155 is connected to the plug 145 and leads into the bottom of the vessel 123 so that liquified inert gas may be drawn from the bottom of the vessel 123 or added to the bottom of the vessel 123 from an external source. This tube 155 is connected to a manual fluid control valve 157 which, in turn, is connected to a liquid coupler 159 through a tube 161. A tube 163 leading from the coupler 159 serves as a manifold to couple the tube 155 and its associated valve 157 to a variety of fluid control devices and to the combustion chamber 125.

A fluid valve, which is preferably a manual liquid or gas valve 165, is connected to the tube 129 adjacent the inlet of the valve 157 and, through a tube 167, to a liquid or gas connector 169. This connector 169 allows the filling of the vessel 123 from a storage supply of liquified inert gas such as liquid nitrogen. The connector 169 can be attached to a tube leading from a supply vessel (not shown) and the valve 165 opened while the valve 157 is closed. By then using the pressure differential between the supply vessel and the vessel 123 or a pump which will operate on a cryogenic liquid, the liquified inert gas may be pumped into the storage vessel 123. During this filling operation, the valve 149 is preferably opened by the operator and thereafter adjusted so that the gas which is formed when the vessel 123 is cooled by the entering liquified inert gas may escape while a desired pressure is maintained within the vessel. To facilitate this manual pressure control, the operator may periodically monitor the pressure within the vessel 123 utilizing a pressure gauge described below.

Three pressure activated safety devices are attached to the liquified inert gas portion of the vessel 123 to produce as safe a container as possible. A tube 171 which is mounted within the bulkhead 137 is connected to a pressure relief valve 173. This valve 173, in the preferred embodiment, is adjusted to release pressure from the vessel 123 to the outside atmosphere when the pressure within the vessel exceeds the maximum desired pneumatic pressure at which the system is designed to operate by approximately 25 percent. Through this pressure limitation, damage due to high pressure gas escape is limited as much as possible. The tube 171 is also connected to a pressure gauge 175 which is used to externally monitor the pressure within the vessel 123, and to a pressure bursting disc 177 which is designed to burst and thereby connect the interior of the vessel 123 to the outside atmosphere when the pressure within the vessel reaches a dangerous level. Since, during long term storage of cryogenic liquid the relief valve 173 will periodically open to vent pressure due to heat which leaks through the walls 129 and 131 to the atmosphere, the bursting disc 177 is intended only as a failsafe precaution to avoid undesirable pressures within the vessel 123 should the relief valve 173 fail to function properly.

The tube 139 which communicates with the liquid oxygen within the bladder 143 is connected to a manual gas and liquid flow control valve 179 which is, in turn, connected to a liquid or gas coupler 181 through a tube 183. The connector 181 can be attached to a tube leading from a liquid oxygen supply vessel (not shown) and the valve 179 opened, while an additional valve 185 leading from the tube 139 is closed. The liquified inert gas may then be supplied to the storage vessel 123 through the valve 169 so that the interior of the vessel 123 is cooled to the storage temperature of the liquified inert gas. Liquified oxygen may be supplied from the liquid oxygen supply vessel using the pressure differential between the supply vessel and the vessel 123 or a pump which will operate on liquid oxygen. During this filling operation, boil off of liquid oxygen should be insignificant since the entire apparatus will be previously cooled by the liquified inert gas. However, safety devices which will be described below are connected to the tube 139 to assure that excessive pressure is not built up within the tube 139 and the bladder 143.

Three pressure activated safety devices are attached to the tube 139 to produce as safe a container as possible. These devices include a pressure relief valve 187, a pressure gauge 189 and a bursting disc 191 each constructed and operating in a manner similar to that described for comparable elements 173, 175 and 177 which coact with the liquified inert gas. The tube 139 is also connected to a manual liquid flow control valve 185 which is, in turn, connected to a liquid coupler 193 through a tube 195 for supplying liquid oxygen from the bladder 143 to the combustion chamber 125.

The combustion chamber 125 is connected through a pair of fluid conduits 197 and 199 to the couplers 193 and 159, respectively, in order to introduce both the liquified oxygen and liquified inert gas into the combustion chamber 125. In addition, the combustion chamber 125 is connected by means of a fluid conduit 201 to the fuel tank 127. This tank 127 typically includes aircraft fuel or other hydrocarbon fuel which will combine with oxygen to produce a highly flamable mixture. The pressure within the vessel 123, which is maintained through a vaporization of liquified inert gas due to heat leakage through the walls 129 and 131, will force liquified oxygen through the conduit 197 and liquified inert gas through the conduit 199 during operation of the combustion chamber 125 so that no external pumping system is required. In addition, the fuel tank 127 can be made self-pumping by diverting a small quantity of the liquified inert gas from the conduit 199 through a conduit 203 into a common finned tubing heat exchanger 205 which removes heat from the ambient atmosphere for vaporizing this small quantity of liquid. The high pressure gas thus produced may be supplied to the fuel tank through a conduit 207. In order to insure that this pressure does not escape from the fuel tank 127, a check valve 209 may be placed within the conduit 211 which is used to fill the fuel tank 127, this check valve permitting flow only into the fuel tank 127. It will thus be seen that, as soon as the valve 157 is opened to permit flow of liquified inert gas to the combustion chamber 125, a small portion of this liquified inert gas will be vaporized within the heat exchanger 205 and will automatically pressurize the fuel tank 127 to assure a flow of fuel into the combustion chamber 125. As an alternative, it is possible to include a fuel pump in the line 201 which may be activated whenever the system is energized.

The combustion chamber 125 comprises a first mixing chamber 213 which is connected to the conduits 197 and 201 and is therefore used to mix the fuel from the tank 127 and the liquified oxygen from the bladder 143. This mixture then passes through a throat 215 of the combustion chamber 125 where it is ignited by an ignition device 217 which is operated in a conventional manner from an ignition circuit 219. The ignition circuit 219 may conveniently be designed to operate in conjunction with the valve 185 so that as soon as liquid oxygen is flowing from the bladder 143 due to opening of the valve 185, the ignition circuit 219 will energize the ignition device 217. The mixture of liquid oxygen and fuel burns with intense heat in an expanding throat 219 and expands into a second mixing chamber 221 of the combustion chamber 125. The conduit 199 is connected tangentially to the mixing chamber 221 to mix liquified inert gas such as liquid nitrogen with the products of combustion. The tangential entrance of the tube 199 assists in a thorough mixing of these materials by initiating a helical flow, as shown by the arrow 223, within the second mixing chamber 221. It will be recognized that the valve 157 and the valve 185 may conveniently be connected in tandem so that the operator may manipulate both valves simultaneously, thus introducing both liquified oxygen and liquified inert gas as well as fuel to the system simultaneously. In addition, if the ignition circuit 219 is designed to operate automatically from the operation of these valves, the entire system may be made to operate from the manipulation of a single valve control.

The introduction of liquified inert gas cools the combustion products within the mixing chamber 221 and substantially increases the mass flow of gas so that a high pressure, high mass flow gas is available at an exhaust conduit 225 of the combustion chamber 125 for operation of pneumatic devices shown schematically at 227. These devices 227 may be aircraft jet engine starting devices or control devices or other aircraft systems which require pneumatic power.

In addition to the external connections which have been previously described, a means for maintaining the desired pressure level within the cryogenic storage vessel 123 is also included in the preferred embodiment. It will be understood by those skilled in the art that the cryogenic liquid within the storge vessel 123 will maintain itself in a pressurized state during storage due to heat leakage through the walls 129 and 131 and the resultant boiling of the liquified inert gas. However, if liquified inert gas is rapidly drawn from the vessel 123, the pressure within the vessel 123 will be decreased and heat entering the vessel 123 through the walls 129 and 131 will not be sufficient to boil enough liquid to maintain the pressures within the vessel 123 for any length of time. A closed loop system is therefore used in the preferred embodiment for maintaining the pressure within the vessel. This loop consists of a heat exchanging tube 229 which is connected to the interior of the liquified inert gas portion of the vessel 123 near the bottom of the vessel 123 and is helically wrapped against the insulation 135 near the exterior wall 131 of the vessel 123. Fluid which enters the tube 229 near the bottom of the vessel 123 and flows through that portion of the tube 229 which is near the insulation 135 will be vaporized, since the interior surface of the insulation 135 is at a temperature above the boiling point of the cryogenic liquid at the pressure at which it is maintained. The other end of the tube 229 is connected through a manual gas control valve 231 to a regulator 233. This regulator 233 is in turn connected through a tube 235 to the bore 147 within the plug 145 and therefore to the liquified inert gas portion of the vessel 123. Since fluid is vaporized within the helical portion of the tube 229, gravity will tend to force the fluid to flow into the tube 229 from the bottom of the vessel 123 as the liquified inert gas is vaporized. This flow is controlled by the regulator 233 and the valve 231. Therefore, as liquid or gas is drawn from the vessel 123, the regulator 233 opens to maintain pressure within the vessel 123. During operation of the device, the manual control valve 231 must be opened if the closed loop pressure build up system is to function. It will be understood that when the vessel 123 is not in use, the pressure within the vessel 123 may build beyond the pressure of the regulator 233 due to heat leakage through the walls 129 and 131 and that the relief valve 173 is therefore utilized to control the upper extreme of this externally produced pressure build up.

Cryogenic liquid or liquified gas in storage vessels from which the liquified inert gas portion of the vessel 123 will be filled is normally maintained at approximately normal atmospheric pressure rather than at an elevated pressure such as that which is required within the vessel 123. If this cryogenic liquid or liquified gas is used to fill the container 123 without precautions for maintaining the cryogenic liquid in a critical or saturated state, the resultant operation of the device will be inhibited.

Figure 4:
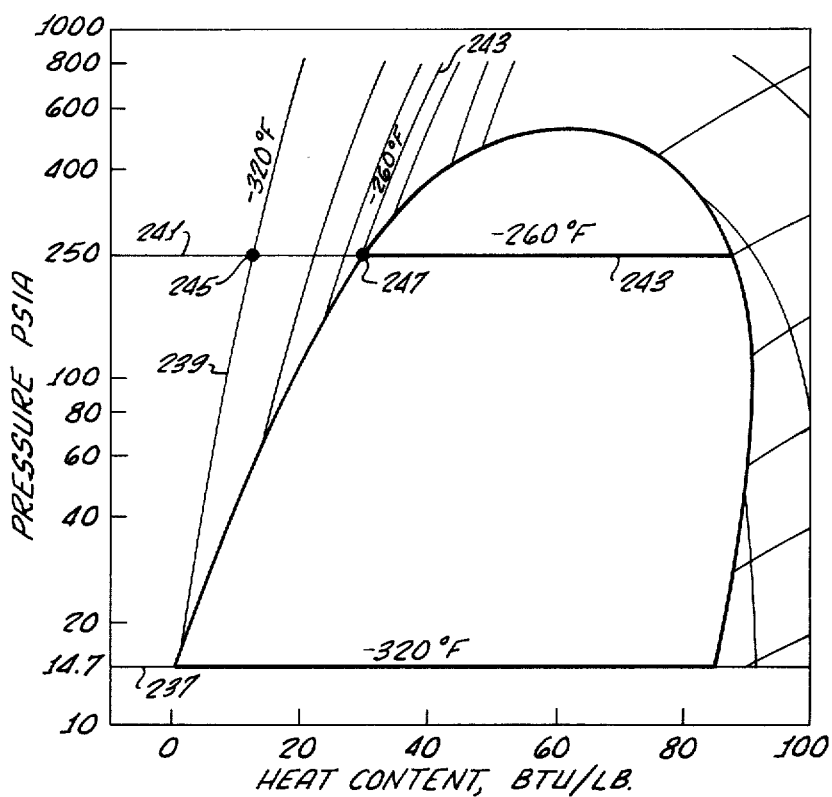
FIG. 4 is an enthalpy diagram showing the various states of storage of the liquified inert gas within the system of FIGS. 1 through 3.

Referring to FIG. 4, an enthalpy curve is shown for an arbitrary cryogenic substance which, in the preferred embodiment shown in FIG. 4, is nitrogen. In this enthalpy curve, the heat content per unit weight of the substance is plotted against pressure. In addition, FIG. 4 shows a series of constant temperature lines. It can be seen that, as the pressure at which the nitrogen is maintained increases, the temperature at which the nitrogen will boil likewise increases. A line 237 has been drawn on FIG. 4 at ambient pressure, that is, 14.7 psia. If nitrogen is allowed to boil freely at this pressure, the nitrogen will be maintained at a temperature of −320°F., as shown by the intersecting line 239. In the present apparatus, for example, it may be desired to maintain a pressure within the vessel 123 at 235 psig or 249.7 psia as shown by the line 241 of FIG. 4. Liquid nitrogen will boil at 249.7 psia at a temperature of −260°F., as shown by the intersecting line 243.

Many cryogenic liquids and liquified gases are extremely poor heat conductors. If therefore liquid nitrogen which is at 14 psia is added to the vessel 123 and the pressure within the vessel 123 is raised to 249.7 psia, the liquid nitrogen which contacts the surface of the wall 129 will be raised in temperature to −260°F. and will boil, thereby maintaining the required pressure within the vessel. However, this boiling of the liquid nitrogen near the surface of the wall 129 can be accomplished while the central mass of the liquid nitrogen within the vessel 123 remains at approximately −320°F., since the liquid nitrogen is a poor heat conductor. The central mass of liquid nitrogen therefore undergoes a pressure increase shown by the line 239 of FIG. 4 and remains at a pressure of 249.7 psia and a temperature of −320°F., which is well within the liquid phase of the diagram of FIG. 4. There is thus a transition between the bulk of the liquid nitrogen existing at a point 245 of FIG. 4 and a peripheral quantity of nitrogen adjacent the wall 229 existing at a point 247 of FIG. 4.

If it is now assumed that liquid is drawn from the vessel 123, the pressure within the vessel will drop due to the void which is left by the removal of the liquid. The peripheral liquid at point 247 in FIG. 4 will move along line 234 and will therefore enter the gas phase of this figure. This peripheral liquid will therefore boil and will tend to maintain the pressure within the vessel 123 at 249.7 psia. The bulk of the liquid which is at point 245, however, will move along line 239 but will still be within the liquid portion of the phase diagram of FIG. 4 and it will therefore not boil. The bulk of the liquid in the vessel 123 therefore will not be useful in maintaining the desired pressure within the vessel 123 as fluid is drawn therefrom. For this reason it has been found advantageous to take precautions to store the liquified inert gas within the vessel 123 in a critical or saturated state, that is, so that the entire bulk is at point 247.

In order to accomplish this, the entire mass of the liquid nitrogen within the vessel 123 must be heated to a temperature of −260°F. while maintaining the pressure at 249.7 psia. If this is accomplished, it can be seen from FIG. 4 that when the liquid is drawn from the vessel 123 the entire mass of the liquified inert gas within the vessel 123 will move along the line 225 of FIG. 4 and will tend to boil. Therefore the entire mass of liquid within the vessel 123 will work to produce gas to maintain the required pressure within the vessel 123 and the system efficiency can be increased.

To this end, a heating element 249 may be mounted within the vessel 123 and energized through an electrical connection 251 to an external source which may be connected to a terminal 253. Once the liquid has been heated so that the entire bulk exists at the point 247 of FIG. 4, the external power supply may be disconnected.

To illustrate the advantages realized by using the closed loop pressure build up system and the critical or saturated state storage of the liquid, FIG. 5 shows the approximate rate of pressure decrease within the vessel 123 due to withdrawal of liquid oxygen and liquified inert gas at a predetermined rate with the valve 233 closed so that the closed loop pressure build up system is not operating. No precautions have been taken in the system plotted in FIG. 5 to assure that the liquid nitrogen existing at an initial pressure of 250 psi within the vessel 123 is stored in a critical or saturated state.

Figure 6:
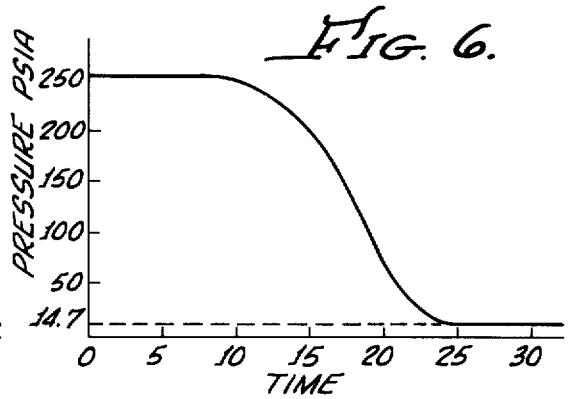

FIG. 6 shows the effect upon the chart of FIG. 5 of opening the valve 233 so that the closed loop pressure build up system tends to maintain system pressure as liquid is withdrawn from the vessel 123.

Figure 7:
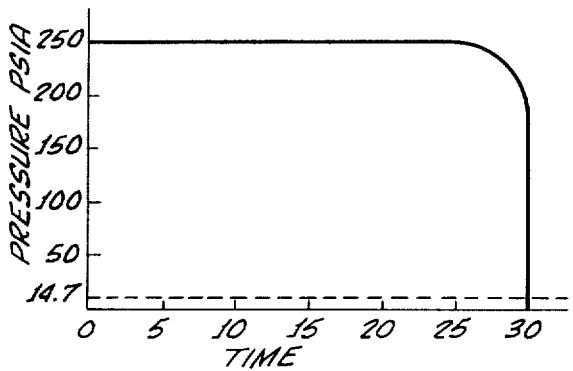

FIG. 7 shows the effect upon the chart of FIG. 6 of storing the liquid nitrogen in a critical or saturated state at the storage pressure prior to liquid withdrawal. It can be seen from this chart that system efficiency has been greatly increased.

Aside from the heating element 249 of FIG. 3, numerous means are available for assuring critical storage of the liquified inert gas. For example, hot gas may be bubbled through the liquid or a stirring mechanism may be installed within the vessel 123 to assure that heat leaking through the walls 129 and 131 will heat the whole bulk of the liquid. Very long storage will also eventually produce saturated liquid at the storage pressure since the peripheral heat will eventually heat the whole mass.

Use of the apparatus shown in FIG. 3 is as follows. An operator fills the vessel 123 with liquified inert gas through the coupler 169 and the valve 165 and then fills the bladder 143 with liquified oxygen through the coupler 181 and valve 179. These valves are closed and the liquified inert gas heated to a critical or saturated state as explained above. The operation of the system may then be initiated by opening valves 185 and 157, preferably in tandem, which energizes the ignition circuit 219 and pressurizes the fuel tank 127 to initiate the combustion process within the combustion chamber 125. This process may continue until the need for pneumatic power has ceased, at which time the valves 185 and 157 may be closed, or, in the alternative, until the supply of liquid oxygen, liquified inert gas or fuel has been depleted.

It should be understood that the form of the liquified gas storage vessel 123 and combustion chamber 125 which has been explained in detail in reference to the embodiment shown in FIG. 3 may be utilized for the liquified gas storage vessels 11 and 77 and the combustion chambers 25 and 91, respectively, of the embodiments shown in FIGS. 1 and 2.

What is claimed is:

1. Apparatus for producing pneumatic power, comprising:
   an insulated vessel, comprising:
   a first container for storing liquified inert gas at an elevated pressure; and
   a second container within said first container for storing liquified oxygen, said second container permitting heat flow from said liquified oxygen to said liquified inert gas when a temperature differential exists therebetween, said second container including means for applying said elevated pressure of said liquified inert gas to said liquified oxygen to pump said liquified oxygen from said second container;
   means for storing a hydrocarbon fuel; and
   a combustion chamber fluidly connected to said storing means and said insulated vessel comprising:
   means for combining said liquified oxygen with said hydrocarbon fuel to produce a high temperature flame; and
   means for injecting said liquified inert gas into said high temperature flame.

2. Apparatus for producing pneumatic power as defined in claim 1 wherein said second container is a flexible bladder within said first container, said bladder being flexible at the storage temperature of said liquified oxygen and said liquified inert gas.

3. Apparatus for producing pneumatic power as defined in claim 1 wherein said inert gas has a boiling point at its storage pressure which is lower than the boiling point of said liquified oxygen at the storage pressure of said liquified oxygen.

4. Apparatus for producing pneumatic power as defined in claim 3 wherein said liquified inert gas is liquified nitrogen.

5. Apparatus for producing pneumatic power as defined in claim 1 additionally comprising:
   means located within said first container for raising the temperature of the entire bulk of said liquified inert gas to the saturated temperature at the storage pressure of said liquified inert gas.

6. Apparatus for producing pneumatic power as defined in claim 1 additionally comprising:
   means connected to said first container for withdrawing inert gas from said first container;
   means connected to said withdrawing means for vaporizing liquified inert gas; and
   means connected to said vaporizing means and said first container for conducting the vapor from said vaporizing means to said first container to maintain a desired pressure within said first container.

7. Apparatus for producing emergency power aboard an aircraft, comprising:
   means for storing liquid oxygen below its boiling point at the storage pressure;
   means for storing a hydrocarbon fuel;
   means for storing a pressurized liquified inert gas;
   a combustion chamber connected to each of said storing means, said chamber including means for mixing said liquid oxygen with said hydrocarbon fuel, burning said mixture, and mixing said liquified inert gas with the combustion products;
   means for pumping substantially all of said liquid oxygen to said combustion chamber regardless of the orientation of said liquid oxygen storing means comprising an expansible means in pressure communication with both said liquified inert gas and said liquid oxygen; and means responsive to the mixture of said liquified inert gas and combustion products for producing power.

8. Apparatus for producing emergency power aboard an aircraft as defined in claim 7 wherein said means for producing power comprises the air turbine starter of a jet aircraft engine.

9. Apparatus for producing emergency power aboard an aircraft as defined in claim 7 wherein said means for producing power comprises electric and hydraulic pressure generators used for producing emergency control power aboard said aircraft.

10. Apparatus for producing emergency power aboard an aircraft as defined in claim 9 additionally comprising:
means for automatically injecting said liquid oxygen, said hydrocarbon fuel and said liquified inert gas into said combustion chamber in response to failure of the electrical and hydraulic systems aboard said aircraft.

11. Apparatus for producing emergency power aboard an aircraft as defined in claim 7 wherein said means for storing liquid oxygen is located within said means for storing a liquified inert gas.

12. Apparatus for producing emergency power aboard an aircraft as defined in claim 7 wherein said combustion chamber comprises:
a first mixing chamber connected to said means for storing liquid oxygen and said means for storing the hydrocarbon fuel;
an ignition conduit in communication with said first mixing chamber, said ignition conduit including an ignition device; and
a second mixing chamber fluidly connected to said ignition conduit and said means for storing a liquified inert gas.

13. A method of producing pneumatic energy, comprising:
storing a quantity of liquified oxygen below the boiling point of said liquid oxygen at the storage pressure;
storing a quantity of liquified inert gas at an elevated pressure in thermal communication with said liquified inert gas;
storing a quantity of fuel;
pumping a portion of said liquified oxygen by using said elevated pressure of said liquified inert gas to exert pressure on said liquified oxygen;
combining a portion of said fuel with a portion of said liquified oxygen;
burning said mixture of fuel and liquified oxygen to produce combustion products; and
mixing said liquified inert gas with said combustion products to vaporize said liquified inert gas and cool said combustion products.

14. A method of producing pneumatic energy as defined in claim 13 wherein said step of storing a quantity of liquified oxygen comprises storing said quantity within said quantity of liquified inert gas.

15. A method of producing pneumatic energy as defined in claim 13 additionally comprising:
conducting said mixture of liquified inert gas and combustion products to a pneumatically actuated mechanical power producing mechanism.

16. A method of producing emergency power aboard an aircraft, comprising:
storing a quantity of liquified inert gas at an elevated pressure;
storing a quantity of liquid oxidizer;
burning a mixture of hydrocarbon fuel and said liquid oxidizer to produce combustion gasses at an elevated temperature;
injecting a liquified inert gas into said combustion gasses to vaporize said inert gas and cool said combustion gasses; and
utilizing the elevated storage pressure of said liquified inert gas to pump said liquid oxidizer and said liquified inert gas for said burning and said injecting steps.

17. A method of producing emergency power aboard an aircraft as defined in claim 16 wherein said liquified inert gas is nitrogen.

18. Apparatus for driving the air turbine starter of a jet aircraft engine, comprising:
an insulated vessel, comprising:
an outer container for storing a quantity of liquid nitrogen;
a flexible bladder supported within and substantially surrounded by said outer container and immersed in said liquid nitrogen for storing liquid oxygen at a pressure substantially equal to the pressure at which said liquid nitrogen is stored;
means for maintaining said liquid nitrogen at an elevated pressure, said pressure being effective to pump said liquid nitrogen and said liquid oxygen from said outer container and said flexible bladder;
means connected to said flexible bladder and utilizing said liquid oxygen to produce a high temperature effluent gas;
means connected to said outer container for injecting said liquid nitrogen into said high temperature effluent gas to produce a high volume effluent gas; and
means for connecting said high volume effluent gas to said air turbine starter.

19. Apparatus for producing pneumatic power, comprising:
a first container for storing pressurized liquified inert gas;
a second container for storing liquified oxygen in thermal and static pressure communication with said liquified inert gas;
a combustion chamber;
means for combining said liquified oxygen with combustible fuel in said combustion chamber to produce a high temperature flame and exhaust gas stream; and
means for combining said liquified inert gas with said high temperature exhaust gas stream to cool the gas stream and increase its volume.

20. The apparatus of claim 19 wherein the second container is disposed within the first container, so as to isolate and minimize boil-off of said liquid oxygen.

* * * * *